(12) United States Patent
Atchley et al.

(10) Patent No.: US 10,109,085 B2
(45) Date of Patent: Oct. 23, 2018

(54) DATA PERSPECTIVE ANALYSIS SYSTEM AND METHOD

(71) Applicant: Walmart Apollo, LLC, Bentonville, AR (US)

(72) Inventors: Michael Atchley, Bentonville, AR (US); Donald High, Bentonville, AR (US); Robert Abate, Bentonville, AR (US); Eric Welch, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 702 days.

(21) Appl. No.: 14/591,560

(22) Filed: Jan. 7, 2015

(65) Prior Publication Data

US 2015/0193788 A1    Jul. 9, 2015

Related U.S. Application Data

(60) Provisional application No. 61/924,959, filed on Jan. 8, 2014.

(51) Int. Cl.

| | |
|---|---|
| *G06T 11/00* | (2006.01) |
| *G06T 11/20* | (2006.01) |
| *G06Q 30/02* | (2012.01) |
| *G06F 17/30* | (2006.01) |
| *G06Q 50/18* | (2012.01) |
| *G06F 11/32* | (2006.01) |
| *G06F 11/34* | (2006.01) |

(52) U.S. Cl.
CPC ......... *G06T 11/206* (2013.01); *G06F 11/323* (2013.01); *G06F 11/3476* (2013.01); *G06F 17/30554* (2013.01); *G06Q 30/0201* (2013.01); *G06Q 50/18* (2013.01); *G06T 11/203* (2013.01)

(58) Field of Classification Search
None
See application file for complete search history.

(56) References Cited

U.S. PATENT DOCUMENTS

| | | | |
|---|---|---|---|
| 6,867,788 B1 * | 3/2005 | Takeda ................. | G06T 11/60 345/440 |
| 7,478,368 B2 * | 1/2009 | Hoover, Jr. ........... | G06F 11/323 714/E11.181 |
| 8,395,624 B2 * | 3/2013 | Souza ................... | G06Q 10/10 345/440 |
| 8,648,860 B2 * | 2/2014 | Vrba ..................... | G06T 11/20 345/440 |

(Continued)

*Primary Examiner* — Gurkanwaljit Singh
(74) *Attorney, Agent, or Firm* — McCarter & English, LLP; David R. Burns (57) ABSTRACT

A data perspective analysis method is provided. The method includes obtaining, using a processor, one or more perspective criteria stored in a memory device. The method includes gathering, at the processor, master data and transactional data associated with each of the one or more perspective criteria. The method includes generating, at the processor, one or more perspectives by applying the one or more perspectives criteria to the master data and the transactional data. The method includes comparing, at the processor, at least two perspectives, and displaying, on a display controlled by the processor, a result of the comparison of the at least two perspectives as a dynamic and animated visualization.

20 Claims, 6 Drawing Sheets

(56) References Cited

U.S. PATENT DOCUMENTS

| | | | | |
|---|---|---|---|---|
| 2004/0212612 A1* | 10/2004 | Epstein | .................. | G06T 15/10 |
| | | | | 345/419 |
| 2008/0096663 A1* | 4/2008 | Lieberman | .............. | A63F 13/10 |
| | | | | 463/42 |
| 2009/0044181 A1* | 2/2009 | Vrba | ....................... | G06T 11/20 |
| | | | | 717/156 |
| 2009/0195536 A1* | 8/2009 | Louise | ............... | G01R 13/0236 |
| | | | | 345/419 |
| 2010/0020098 A1* | 1/2010 | Elmieh | .................. | G06T 15/00 |
| | | | | 345/629 |
| 2011/0012917 A1* | 1/2011 | Souza | ................... | G06Q 10/10 |
| | | | | 345/593 |
| 2012/0218254 A1* | 8/2012 | Abeln | ................... | G06T 11/206 |
| | | | | 345/419 |
| 2013/0235066 A1* | 9/2013 | Souza | .............. | G06F 17/30247 |
| | | | | 345/593 |
| 2014/0075004 A1* | 3/2014 | Van Dusen | ............. | H04L 41/04 |
| | | | | 709/223 |
| 2014/0149924 A1* | 5/2014 | Sharp | ................. | G06F 11/3476 |
| | | | | 715/786 |

* cited by examiner

| Num | Perspect | Th year | la year | bgh th y | bgh l y | Category | Impact | Hypothesis |
|---|---|---|---|---|---|---|---|---|
| 1 | Null Person | no | no | no | no | Basic | n | Could base line |
| 2 | Pri NP | no | yes | no | no | Basic | n | Chicken had no impact |
| 3 | Pri WLP | no | yes | no | yes | Basic | n | Chicken had no impact in continuing membership |
| 4 | New P NP | yes | no | yes | no | Basic | n | Chicken hasn't had any impact yet |
| 5 | New P WTP | yes | no | yes | yes | Basic | n | Chicken has impacted these new members |
| 6 | Cur NP | yes | yes | no | no | Basic | n | Chicken had no impact in continuing membership |
| 7 | Cur WLP | yes | yes | no | yes | Basic | n | Chicken has no impact. Why did this member stop buying the chicken? |
| 8 | Cur WTP | yes | yes | yes | no | Basic | y | Chicken has impacted this current member this year |
| 9 | Cur WLTP | yes | yes | yes | yes | Basic | y | Chicken has impacted this current member both years |
| 10 | Pri NP | no | yes | no | no | Advantage | n | Chicken had no impact |
| 11 | Pri WLP | no | yes | no | yes | Advantage | n | Chicken had no impact in continuing membership |
| 12 | New P NP | yes | no | yes | no | Advantage | n | Chicken hasn't had any impact yet |
| 13 | New P WTP | yes | no | yes | yes | Advantage | y | Chicken has impacted these new members |
| 14 | Cur NP | yes | yes | no | no | Advantage | n | Chicken had no impact |
| 15 | Cur WLP | yes | yes | no | yes | Advantage | n | Chicken has no impact. Why did this member stop buying the chicken? |
| 16 | Cur WTP | yes | yes | yes | no | Advantage | y | Chicken has impacted this current member this year |
| 17 | Cur WLTP | yes | yes | yes | yes | Advantage | y | Chicken has impacted this current member both years |
| 18 | Pri NP | no | yes | no | no | Plus | n | Chicken had no impact |
| 19 | Pri WLP | no | yes | no | yes | Plus | n | Chicken had no impact in continuing membership |
| 20 | New P NP | yes | no | yes | no | Plus | n | Chicken hasn't had any impact yet |
| 21 | New P WTP | yes | no | yes | yes | Plus | y | Chicken has impacted these new members |
| 22 | Cur NP | yes | yes | no | no | Plus | n | Chicken had no impact in continuing membership |
| 23 | Cur WLP | yes | yes | no | yes | Plus | n | Chicken has no impact. Why did this member stop buying the chicken? |
| 24 | Cur WTP | yes | yes | yes | no | Plus | y | Chicken has impacted this current member this year |
| 25 | Cur WLTP | yes | yes | yes | yes | Plus | y | Chicken has impacted this current member both years |

DATA PERSPECTIVE ANALYSIS SYSTEM AND METHOD

CROSS REFERENCE TO RELATED APPLICATION

This patent application claims priority to the Provisional Patent Application No. 61/924,959, filed Jan. 8, 2014, entitled "DATA PERSPECTIVE ANALYSIS SYSTEM AND METHOD," which is herein incorporated by reference in its entirety.

FIELD OF THE DISCLOSURE

Some aspects of the present disclosure relate generally to the field of data visualization. More particularly, some aspects of the present disclosure relate to a data perspective analysis system and method, and visualization using the same.

BACKGROUND OF THE DISCLOSURE

Conventionally, data perspectives are static and limited to a cube data structure or object. However, such conventional data perspective analysis tools are limited to a subset of the features of a cube. In such conventional cube data structures, perspectives do not include data elements that are not defined in the parent cube, or data elements that are outside the parent cube object. Such conventional perspective analysis tools are limited to specific software and hardware platforms. In large organizations, where multiple data objects reside on multiple different types of databases, each having their own data structures, such limitation of restricting perspectives to being within the cube data structure or subsets thereof is detrimental to full utilization of business intelligence and analytics. Further, conventional data perspectives have a limited definition of being a subset of a model, implying static predetermined data arrays.

In view of the foregoing, conventional data perspective systems and methods have certain limitations and problems, e.g., being static and limited in perspective analysis capabilities.

SUMMARY OF THE DISCLOSURE

In view of the foregoing, there is a need for flexible and dimensionally limitless data perspective analysis system and method in an integrated environment. Some aspects of the present disclosure address at least the above-noted problems.

In accordance with one aspect of the present disclosure a data perspective analysis method is provided. The method includes obtaining, using a processor, one or more perspective criteria stored in a memory device, the perspective criteria being associated with relationship criteria for data dimensions, gathering, at the processor, master data and transactional data associated with each of the one or more perspective criteria, generating, at the processor, one or more perspectives by applying the one or more perspectives criteria to the master data and the transactional data, comparing, at the processor, at least two perspectives, and displaying, on a display controlled by the processor, a result of the comparison of the at least two perspectives as a dynamic and animated visualization.

In accordance with one aspect of this disclosure, a computer readable medium storing computer executable instructions thereupon for data perspective analysis is provided. The instructions when executed by a processor cause the processor to obtain one or more perspective criteria stored in a memory device, the perspective criteria being associated with relationship criteria for data dimensions, gather master data and transactional data associated with each of the one or more perspective criteria, generate one or more perspectives by applying the one or more perspectives criteria to the master data and the transactional data, compare at least two perspectives, and control a display to display a result of the comparison of the at least two perspectives as a dynamic and animated visualization.

In accordance with one aspect of this disclosure, a data perspective analysis system is provided. The data perspective analysis system includes a memory device in which one or more perspective criteria are stored, the perspective criteria being associated with relationship criteria for data dimensions. The data perspective analysis system includes a processor in communication with the memory device. The processor is configured to gather master data and transactional data associated with each of the one or more perspective criteria, generate one or more perspectives by applying the one or more perspectives criteria to the master data and the transactional data, compare at least two perspectives, and control a display to display a result of the comparison of the at least two perspectives as a dynamic and animated visualization.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

BRIEF DESCRIPTION OF THE DRAWINGS

FIG. 3 illustrates an exemplary perspective analysis matrix, in accordance with an aspect of the present disclosure.

DETAILED DESCRIPTION OF THE DRAWINGS

Various aspects of this disclosure are directed toward providing a perspective analysis capability environment for an organization. Organizations have numerous multi-level data associated with various activities of the organization (e.g., sales, advertisement, research, etc.). Such multi-level data is stored as different data dimensions. Such data is associated with persons or agents (or, demographics), a geographic location, an item or service provided by the organization, along with associated time stamps or triggering events. Various aspects of this disclosure allow a comparison of such data dimensions across different platforms within an organization, as well as data obtainable from outside an organization, to carry out an analysis that may positively impact an organization's business goals. Such data may be generated from various criteria or filters that may be defined by business analysts and may provide one or more perspectives based on such criteria for analysis.

The aspects of this disclosure are not limited in its application to the details of construction and the arrangement of components set forth in the following description or illustrated in the drawings. The aspects of this disclosure may be configured to be carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

An aspect of the present disclosure is directed to a data perspective analysis system 100. The term "perspective" may relate to specific pieces of information associated with a data item. Generally, the term "perspectives" relates to defining relationship criteria for data dimensions that associate transactions into groups. More specifically, the term "perspectives" relates to the defining relationship criteria for dimensions that associate transactions into groups which focus an analyst's views on specific conditions for further comparison with other perspectives. The term "perspective analysis" may relate to comparison and/or contrast of two or more different perspectives to understand similarities and differences between such two or more perspectives. The data perspective analysis system 100 may allow an organization to perform analyses related to, e.g., member profitability, complete profile view of the customer, store value analysis, and/or product profitability analysis for an organization. The data perspective analysis system 100 may provide an environment available for the organization to consolidate and reuse these and other different perspectives. Conventionally, such analysis is carried out on an ad-hoc one-off basis and then not used for any other solution. The data perspective analysis system 100 provides the capability to pull these different perspectives along with other perspectives together to present an integrated visualization to one or more users (e.g., marketing personnel).

As used herein, the term "organization" is related to any individual or collection of individuals or other entities that may use the data perspective analysis system 100. Such an organization may include an individual, company, corporation, marketing and sales agency, partnership, association, club, foundation, agencies, organization, federal government, state or local governments, charities that may carry out data perspective analysis.

Figure 1:
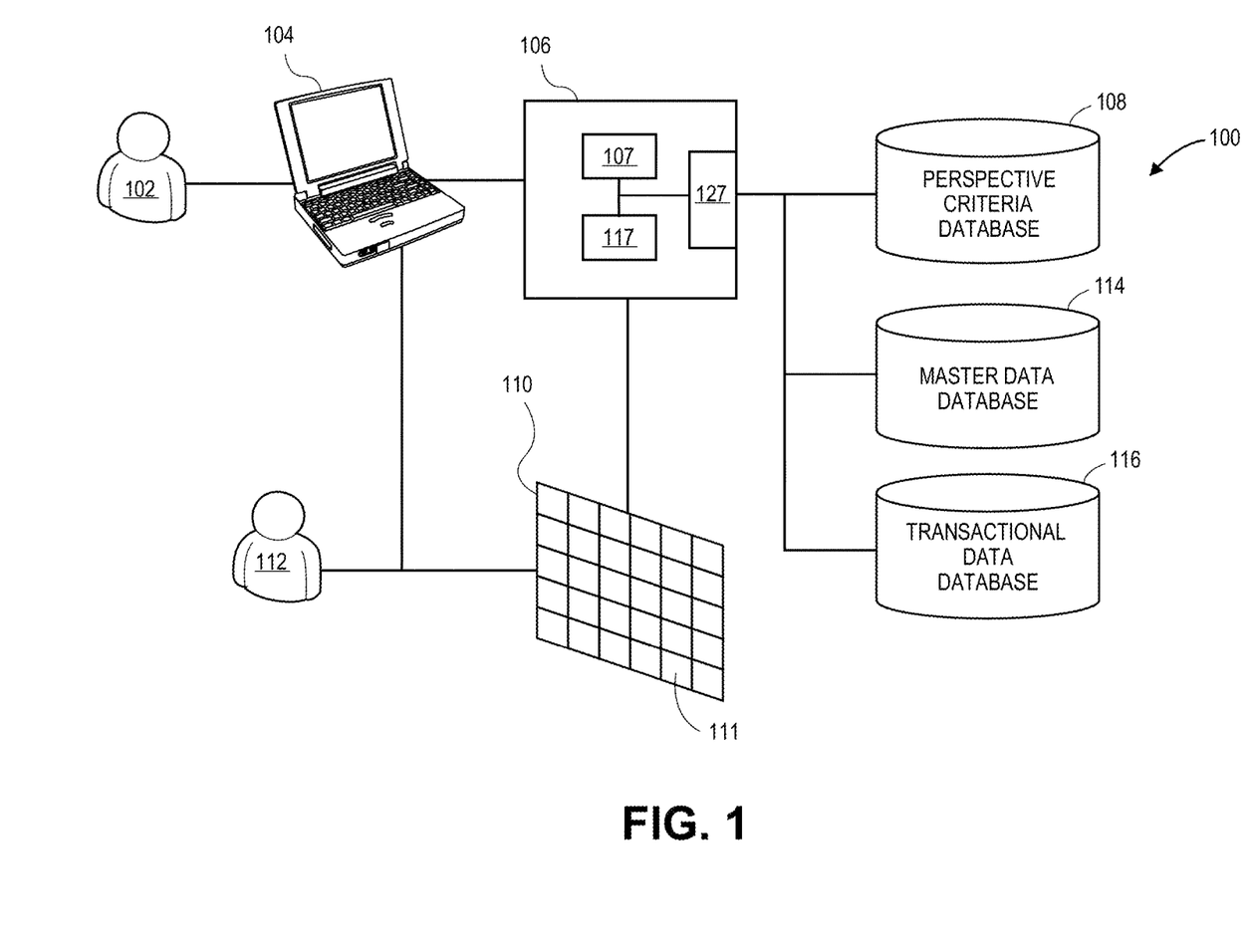
FIG. 1 illustrates a schematic diagram of a data perspective analysis system, in accordance with an aspect of the present disclosure.

Referring now to the figures wherein like reference numbers refer to like elements, FIG. 1 shows an aspect of the data perspective analysis system 100. The data perspective analysis system 100 includes an agent 102 communicating with a data perspective client computer 104. The data perspective client computer 104 is coupled to a data perspective server device 106. In one aspect, the data perspective client computer 104 may be used by the one or more users or viewers 112. The data perspective server device 106 is coupled to a display 110. The data perspective server device 106 is further coupled to a perspective criteria database 108. In one aspect, the data perspective server device 106 is still further coupled to a master data database 114 and to a transactional data database 116. In an alternative aspect, the data perspective server device 106 may be coupled to an integrated database that includes the structure and functionality of the perspective criteria database 108, the master data database 114, and the transactional data database 116. The display 110 may be viewed or used by one or more viewers 112. It is to be noted that although FIG. 1 illustrates one agent 102, one data perspective client computer 104, one data perspective server device 106, one perspective criteria database 108, one display 110, one master data database 114, one transactional data database 116, in various aspects of this disclosure, more than one such devices or entities may be present, and the number of components of the data perspective analysis system 100 shown in FIG. 1 are by way of example only and not by way of limitation.

The communication between the agent 102 and the respective couplings or connections between the data perspective client computer 104, the data perspective server device 106, the perspective criteria database 108, the display 110, the master data database 114, the transactional data database 116 may be over wired, optical, or wireless channels, or combinations thereof. Further, such couplings may be in other topologies than that shown in FIG. 1. For example, some components of the data perspective analysis system 100 may be in one physical space (e.g., same building), while some other may be in a different physical space (e.g., another city), and may be communicably coupled to each other over a communication network (not shown). Such a communication network may be the Internet, a private network, a Virtual Private Network (VPN), a Local Area Network (LAN), a Wide Area Network (WAN), any other suitable network or communication system, and/or combinations thereof, as may be understood by one of ordinary skill in the art. Furthermore, in one aspect of the disclosure, one or more components of the data perspective analysis system 100 may be combined into one. For example, the perspective criteria database 108, the master data database 114, the transactional data database 116, and the display 110 may all be part of a single computer device.

In another example, the data perspective client computer 104 and the data perspective server device 106 may be a front-end of a computer device and the perspective criteria database 108 may be a back-end for such a computer. The terms "front-end" and "back-end" have conventional meanings known to one of ordinary skill in the art. In yet another example, the agent 102 may be remote or physically away from the system and the one or more viewers 112 may be guided by the agent 102 to communicate with the data perspective client computer 104 and/or the data perspective server device 106 to view one or more visualizations of data perspective analysis, in accordance with various aspects of this disclosure. Similarly, one or more components of the data perspective analysis system 100 may be optional and various functionalities and features of such components, when optional, may be carried out by other devices in the data perspective analysis system 100.

The agent 102 may be an entity that is capable of or is configured to setup various parameters for proper function of the data perspective analysis system 100. In one aspect of the disclosure, the agent 102 may be a physical entity. By way of example only, the agent 102 may be a human being (e.g., a data specialist or a business analyst), a robot, or an electronic device that may communicate with the data perspective client computer 104 by exchanging signals over wired, optical, or wireless channels to setup the data perspective analysis system 100 for appropriate operation. Alternatively, in one aspect of the disclosure, the agent 102 may be a software agent that can be programmed to assist or even replace a physical entity for the agent 102. Such a software agent may execute on a computer (e.g., the data perspective client computer 104). Such a software agent may include code or a set of instructions residing on a memory of the data perspective client computer 104, which code when executed by a processor of the data perspective client computer 104 and/or the data perspective server device 106, causes the processor to implement the various features and functionalities of the data perspective analysis system 100, as discussed herein (e.g., performing data perspective analysis). In one aspect of the disclosure, the agent 102 may send one or more requests to the data perspective client computer 104 for identifying one or more perspective criteria provided by the data perspective analysis system 100, as discussed herein.

The data perspective client computer 104 may include a processor, a memory, and a communications interface configured to receive a request to setup the data perspective analysis system 100. By way of example only, the data perspective client computer 104 maybe a laptop, a personal computer, a desktop, a hand-held computing device, or other types of computing devices having code residing on the memory, which code when executed by the processor of the data perspective client computer 104, cause the processor to process one or more requests received from the agent 102 to setup the data perspective analysis system 100 for use. Examples of the request may include data packets with information that identifies one or more perspective criteria. In one aspect, the data perspective client computer 104 may be configured to receive a request to carry out data perspective analysis from the one or more users or viewers 112.

The data perspective server device 106 may be a server device having a processor 107, a memory 117, a communications interface 127, operatively coupled to each other by, for example, internal buses. By way of example only, the data perspective server device 106 maybe a laptop, a personal computer, a desktop, a hand-held computing device, or other types of computing devices having code residing on the memory 117, which code when executed by the processor 107, causes the processor 107 to implement and carry out data perspective analysis, for example, as discussed with respect to FIG. 2. For example, the data perspective server device 106 may be configured to maintain, extract, and/or update perspective criteria from the perspective criteria database 108 to present visualizations related to perspective analysis on the display 110. In one aspect of the disclosure, the processor 107 may be configured to carry out various iterations of the processes or operations discussed with respect to FIG. 2, e.g., to dynamically change the results of the perspective analysis displayed on the display 110 based upon inputs from the agent 102 and/or the viewers 112 (e.g., zooming in or out to change a scale of the visualization(s) on the display 110).

The perspective criteria database 108, the master data database 114, and the transactional data database 116 each may be memory devices configured as databases. Such memory devices may be stand-alone memory devices or may be a part of one or more server devices having processors, memory or other non-transitory storage media, input-output interfaces, buses, power supply and cooling systems, etc. The perspective criteria database 108, the master data database 114, and the transactional data database 116 may be configured to store a plurality of data in various forms, e.g., data structures known to those of ordinary skill in the art. Data may be stored in various dimensions, e.g., one dimension, two dimensions, three dimensions, or higher dimensional hyper-cubes of data. Such data may be subject to extraction or slicing along one or more data dimensions for performing data perspective analysis. The perspective criteria database 108, the master data database 114, and the transactional data database 116 may store data as done in databases such as those provided by Teradata Corporation of Dayton, Ohio, DB2®, or INFORMIX® from IBM Corporation of Armonk, N.Y., SQL SERVER® from Microsoft Corporation of Redmond, Wash., databases from Oracle Corporation of Redwood Shores, Calif., combinations thereof, or other databases known to one of ordinary skill in the art. The types of databases may be, for example, a Structured Query Language (SQL) database, and others.

The term "master data" as used herein relates to dimensions such as "who" (e.g., individuals, roles, organizations), "what" (e.g., things, services, business processes), "where" (e.g., places, locations) that are not based upon a date and time occurrence. The term "transactional data" relates to facts (e.g., events, incidents, actions) that are based upon a date and time occurrence and unite dimensions as in a relationship topology (e.g., a star schema) of a fact surrounded by relating dimensions. Master data examples may include customers, associates, vendors, merchandise suppliers, stores, products, cities, states, countries (these type of entities are on-going spanning date and time). Transactions or transactional data examples may include payments, orders, purchases, shipments (these types of entities are statically associated with a date and time that the event occurred). In one aspect, the master data in the master data database 114 and the transactional data in the transactional data database may be associated with a "sandbox" type database (known to one of ordinary skill in the art). Such a sandbox area is an area of a memory device controlled by the user where the data structure may be set up in advance or set at the time of loading date from the data structure being loaded. The control is not by a database administrator but rather by the analytical tools being used. In this case, the database structure would be controlled by the data perspective server device 106. The perspective criteria database 108, the master data database 114, and the transactional data database 116 may then be configured by the processor 107 to perform data perspective analysis, as discussed for example with respect to FIG. 3.

The display 110 includes a plurality of pixels or pixel groups 111. Such pixels or pixel groups 111 have physical properties such as illuminiscence, reflectance, fluorescence, etc., which are transformed based upon the visualizations controlled by the processor 107 or other graphics processor(s) in the data perspective server device 106. The display 110 may be a screen, a monitor, or other types of surfaces on which one or more data visualizations may be projected. For example, the screen may be a projector screen or a wall, the monitor may be a computer monitor, a liquid crystal display monitor, a high-definition monitor, and the like, or combinations thereof. In one aspect of the disclosure, the display 110 includes a plurality of pixels. Each of the plurality of pixels may be controlled by the processor 107 and/or the graphics processor to vary intensity levels indicative of the one or more visualizations resulting from the data perspective analysis carried out by the data perspective analysis system 100. For example, the pixels 111 may be addressable by the graphics or display processor implemented by the processor 107. Further, the groups of pixels in the plurality of pixels 111 may be allocated to one or more forms of data visualizations. For example, one group of pixels may be configured to display a static or an animated bar chart while another group of pixels may be configured to show a static or an animated line graph, and so on, as may be understood by one of ordinary skill in the art. A display controller associated with the display 110 may configure the display 110 to be refreshed at an appropriate raster scan rate to accommodate the transformation of the physical properties of the pixels 111 to show the results of data perspective analysis in a visually pleasing manner, e.g., as a dynamic or an animated visualization.

The data perspective analysis results presented as visualizations on the display 110 are provided to the one or more viewers 112. Such one or more viewers 112 may be business analysts, individuals or groups of individuals who can make informed decisions regarding various matters based on the presentation of the one or more visualizations on the display 110. By way of example only, the one or more viewers may include "C-level" executives, senior policy makers, members of the public, or other users of the data perspective analysis system 100 for whom data perspective analysis may be geared towards. In one aspect of the disclosure, the one or more viewers 112 may be independent of the data perspective analysis system 100, and/or may be end users thereof.

Figure 2:
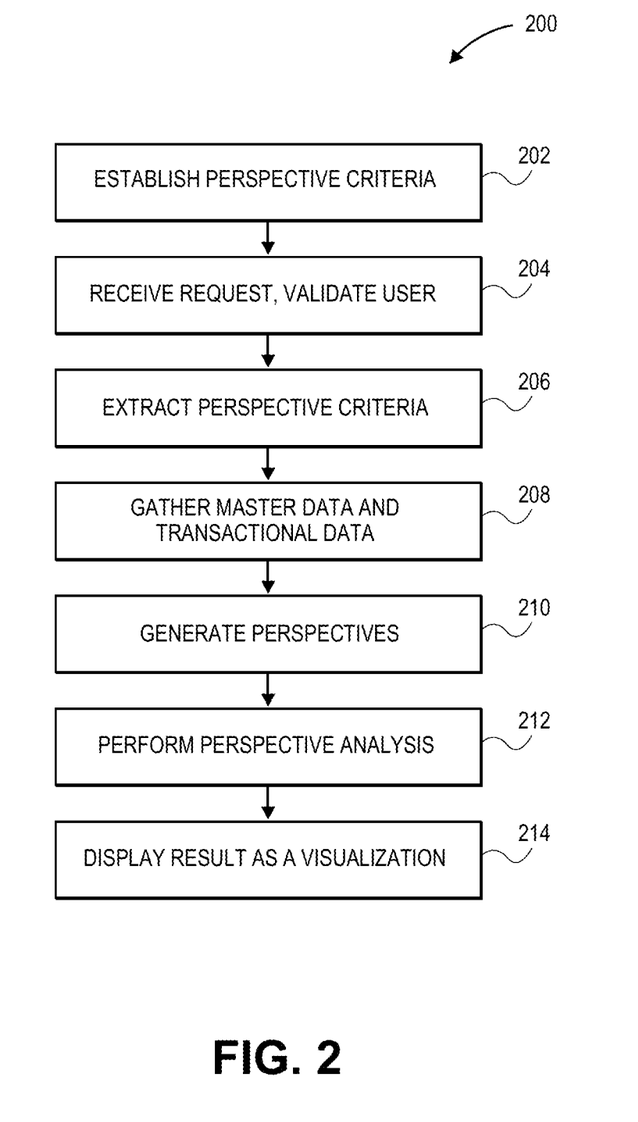
FIG. 2 illustrates a flow diagram of an exemplary data perspective analysis method, in accordance with an aspect of the present disclosure.

Referring to FIG. 2, an exemplary data perspective analysis method 200 is illustrated. It is to be noted that although the method 200 illustrates one or more operations 202-216 in an exemplary order, the operations 202-216 may be carried out in any order. Further, one or more operations 202-216 may be combined, skipped, split into sub-operations, or carried out in parallel, as may be contemplated by one of ordinary skill in the art in view of this disclosure. The operations 202-214 may be carried out by the processor 107. Alternatively, the operations 202-214 may be carried out in a distributed manner by different processors of the data perspective analysis system 100.

In an operation 202, the processor 107 establishes perspective criteria. The processor 107 may establish the perspective criteria in the memory 117. In one aspect, the processor 107 may establish the perspective criteria in the perspective criteria database 108 (e.g., in a memory device thereof). For example, such perspective criteria established by the processor 107 may include conditional statements related to "what", "when", "where" and/or "who" for an organization, although combinations of such conditions or additional perspective criteria could be used. The "what" perspective criteria may relate items, services, and/or merchandise being sold by the organization. The "when" perspective criteria may relate to a time or a duration (e.g., hourly, daily, etc.). The "who" perspective criteria may relate to customers, e.g., based upon age groups, demography, income levels, etc. The "where" perspective criteria may relate to geographical location associated with the other perspective criteria, for example, a country, a division in the organization located in a particular state, etc.

In one aspect, the processor 107 may establish the perspective criteria dynamically based upon inputs from the agent 102 and/or the one or more viewers 112, via the data perspective client computer 104. For example, the processor 107 may provide the agent 102 and/or the one or more viewers 112 with a Graphical User Interface (GUI) to create or select one or more perspective criteria in the perspective criteria database 108. In one aspect, in the operation 202, the establishing of the perspectives criteria in the memory 117 and/or the perspective criteria database 108 may include maintaining, using the processor 107, the one or more perspective criteria by updating, deleting or adding additional perspective criteria to the established one or more perspective criteria in the memory 117 and/or the perspective criteria database 108. In one aspect, the deleting of one or more perspective criteria may be carried out to remove obsolete perspective criteria. For example, each perspective criteria in the memory 117 and/or the perspective criteria database 108 may have a time stamp associated with it. The agent 102 and/or the one or more viewers 112, or any other entity associated with the administration of the perspective criteria may program the processor 107 to delete those perspective criteria that are older than a predetermined time period. Further, the perspective criteria may be updated, deleted, or added for other reasons. For example, when a particular item for sale is no longer being offered for sale by an organization, the perspective criteria associated with that item may be deleted.

In an operation 204, the processor 107 receives a request from the agent 102 and/or the one or more viewers 112. The request may include an identification of one or more perspective criteria in the perspective criteria database 108. In one aspect, the request may be made via the data perspective client computer 104 coupled to the data perspective server device 106. In one aspect, the processor 107 may validate the request based upon specific credentials of the agent 102 and/or the one or more viewers 112 stored, for example, in the memory 117. In one aspect, the request may be serviced by the data perspective server device 106 only upon successful validation of the request forwarded by the data perspective client computer 104. In one aspect, such validation may be optional.

In an operation 206, the processor 107 of the data perspective server device 106 extracts or obtains the one or more perspective criteria stored in the memory 117 and/or the perspective criteria database 108. In one aspect, the perspective criteria database 108 and the memory 117 may communicate via the communications interface 127 to synchronize the perspective criteria so that each has a matching set of perspective criteria. For example, the memory 117 may buffer the perspective criteria temporarily for processing by the processor 107. Alternatively, the perspective criteria stored in the memory 117 may be a subset of the perspective criteria stored in the perspective criteria database 108. In one aspect, such obtaining of the perspective criteria by the processor 107 may include using the stored one or more perspective criteria to determine the master data and transactional data to be gathered from the master data database 114 and the transactional data database 116, respectively. One exemplary reason or power behind the perspective analysis carried out by the data perspective server device 106 is that more than one perspective is used for a comparison. One or more perspectives act as intervention or treatment groups while the other is a control or baseline group for comparison. Both control and interventions are needed to measure a change between them, determining the influence, effect, or impact of the other.

In an operation 208, the processor 107 gathers the master the master data and the transactional data from the master data database 114 and the transactional data database 116, respectively, based upon the determination in the operation 206 regarding which ones of such data are to be gathered. The gathering of the master data and transactional data from the master data database 114 and the transactional data database 116, respectively, may include loading the master data and the transactional data into memory 117. Upon loading, such master data and transactional data may be provided to the data perspective client computer 104 if the agent 102 and/or the one or more viewers 112 wish to view the master data and the transactional data. Data gathering may be carried out by Structured Query Language (SQL) using "where" clauses and joins or through filters in Extraction Transformation Load/Extraction Load Transformation (ETL/ELT) tools. Usually, there is a source database or dataset where the extraction occurs. The transformation may occur within a tool to align multiple data sources in size and type of data structure. The loading may occur through the same tool to a sandbox area or a database. Additionally, there may be an analytical tool used to aggregate the data at a higher level or SQL may use aggregation functions such as sum, average, minimum, or maximum. There may also be mathematical equations used through statistical models. Regardless, these transformations may occur in or before the sandbox. Additionally, there may be the mashing or combining of other data from other internal or external sources within the sandbox or other databases.

In an operation 210, the processor 107 generates one or more perspectives by applying the one or more perspectives criteria to the master data and the transactional data. In one aspect, such generation of the perspectives is carried out by the processor 107 merging the master data and the transactional data. Applying perspective criteria limits the analysis to a specific view of the information which may be either the intervention or treatment group or the control group. Master data provides who, what, and where of the perspective but transactional data provides the event, incident, or action. Transactional data is meaningless without knowing who, what, where, and when it occurred.

By way of example only, FIG. 3 illustrates an exemplary perspective matrix 300 generated by the processor 107. The perspective matrix 300 may be stored in the memory 117. Alternatively, the perspective matrix 300 may be stored in one or more databases outside the data perspective analysis system 100. The exemplary perspective matrix 300 provides multiple criteria for each row. What a data scientist using the data perspective server device 106 wants to do is compare one row to another to see what one difference between rows would make statistically. This indicates what, if any, level of influence occurred. In the perspective matrix 300, each row 1-25 is an example of a perspective, although higher or lower number of rows may be present. For example, row 1 is a perspective of a null person ("NP"), row 2 is a perspective of a Primary NP, etc. Null Person is one who was not a member last year or this year. By way of example only, the null person may be someone who did not buy, e.g., rotisserie chicken this year or last year, although items or services, or sales criteria, other than rotisserie chicken may be used and rotisserie chicken is being discussed here as an example only. The numerical values associated with the null persons are used as a control group or baseline.

The acronym "Pri NP" stands for those customers who were members last year but not this year and did not buy, e.g., rotisserie chicken last year nor this year, "Cur NP" means currently a member this and last year but not purchasing, e.g., chicken; "WLP" means with last year purchase; "WTP" means with this year purchase; "WLTP" means purchasing this year and last year; "Category" indicates what type of membership the member has; "Bgh" means bought, e.g., the rotisserie chicken; "th y" means this year; "l y" means last year.

By way of example only, the perspective matrix 300 illustrates perspectives 1-25 generated with respect to sales of rotisserie chicken under various perspective criteria, although sales or other metrics (e.g., production, demand, profits, etc.) of other items or services may be used, and the sales numbers for chicken is by way of example only and not by way of limitation. For example, the perspective criteria for members or customers may include criteria such as "how many chickens purchased in a year?", "most in a month?", "average per month?", "how many visits per year, month, week, day?", "average visits per year, month, week, day?", "average basket size when purchasing chicken per year, month, week, day?", etc. Likewise, for the same item (i.e., chicken) the perspective criteria applied to a store to generate the perspectives 1-25 may include criteria such as "number of chickens sold vs. number of member visits", "number of chickens sold vs. location of clubs", "number of chickens sold vs. memberships", "average chicken sales per month by club", "what time of the year are the best or worst for chicken sales?", "how many associates are buying chickens?", "which demographic group is purchasing chickens more?", "what time of day has the most chicken sales?", "what day of the week has the most chicken sales?", "how many chickens are the customers purchasing at a time?", "which type of member is purchasing the chickens?", etc. The perspective matrix 300 may include additional columns such as application of the perspective criteria to current year, past year, "bgh", and Boolean impact measurement variable, a category variable, a hypothesis variable, a comments section, etc. Generally, perspective matrices similar to the perspective matrix 300 and the analysis therefor may be carried out for any variable or criteria affecting the organization. For example, perspectives may be generated for how activities by the customer, the organization or a third party affect various aspects of the organization. For example, the perspective matrix 300 may show how advertising, sales, price per unit, time of sale, store location, or other criteria affected the sales of a particular product. In one aspect one or more of such criteria may be held constant while the other may vary to provide different types of perspectives generated by the processor 107.

In an operation 212, the processor 107 carries out perspective analysis of the perspectives 1-25. In one aspect, such perspective analysis includes the processor 107 comparing two or more perspectives 1-25 generated by applying the perspective criteria. In the perspective matrix 300, the comparison result is highlighted to indicate one or more data dimensions of interest (e.g., the shaded columns or rows show specific criteria that are met with respect to perspective number 6, etc.). The comparison occurs via the graphs with each perspective as a series on a graph or a visualization 500 as an animation on the display 110 in FIG. 5. The visual display is easier than numbers to see the differences but usually the differences are also shown in numbers. Sometimes only the differences are plotted on the visualization 500 (shown as a graph by way of example only) depending on the perspective criteria selected. Analysts have to see the negative as well as the positive differences. To do a comparison, usually there are only one or two differences in criteria between the perspectives so the effect of the intervention or treatment can be seen. An intervention could be as simple as a price change up or down. Up might increase the margin but may decrease the quantity sold. Down might increase the quantity sold but may decrease the margin. Other interventions might be providing a demonstration of the product, a flyer in the mail, an advertising spot, providing associate with flexible hours, implementing a recycling program, or other criteria that are different from one perspective to another. Usually, the business analyst using the data perspective server device 106 ascertains if there was a cost savings or an increase in profit that occurred, or other data of interest to the agent 102 and/or the viewers 112.

Figure 4:
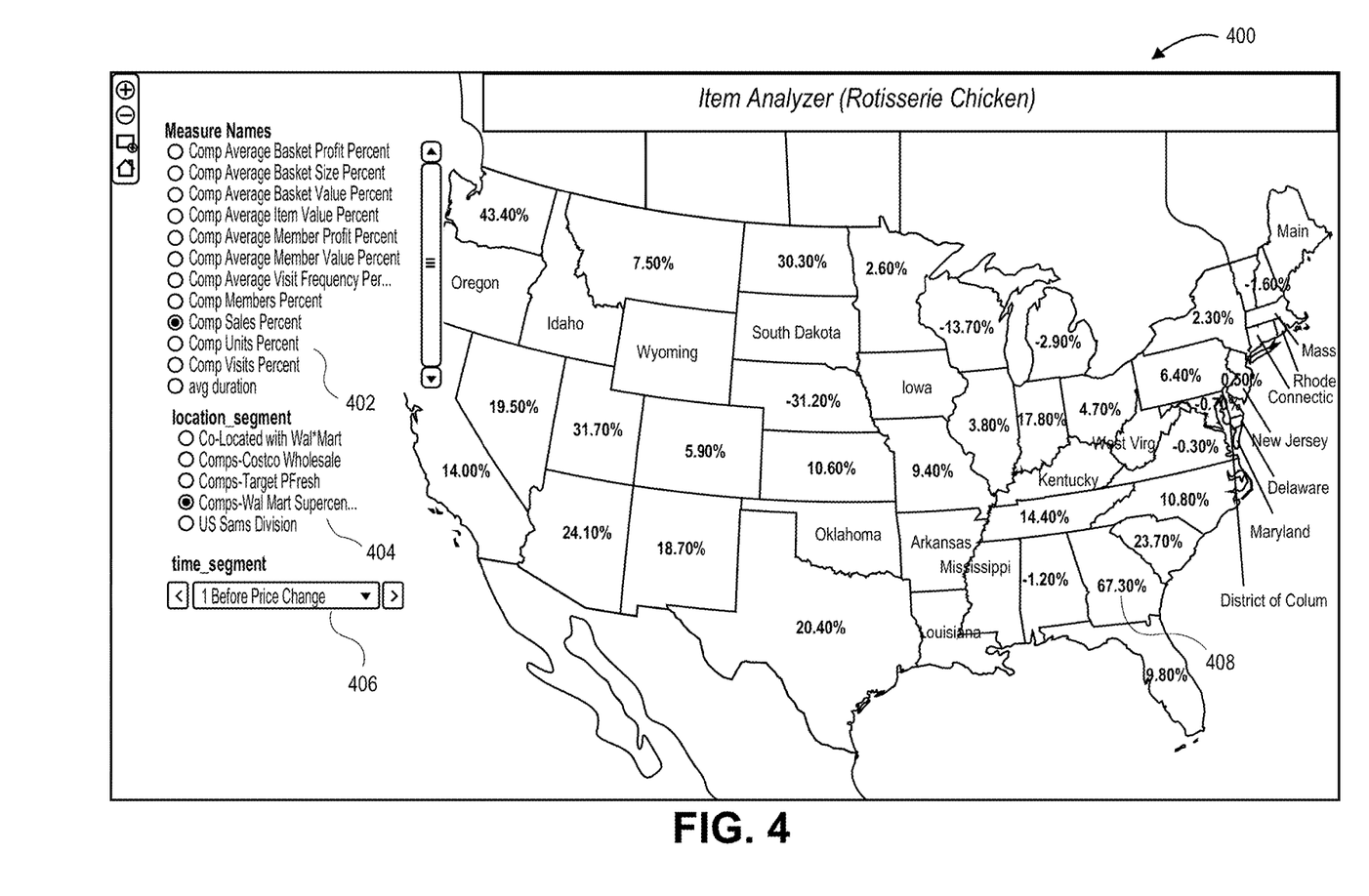
FIGS. 4 and 5 illustrate exemplary visualizations of results from the data perspective analysis carried out using the data perspective analysis system of FIG. 1 using, for example, the method of FIG. 2, in accordance with an aspect of the present disclosure.
Figure 5:
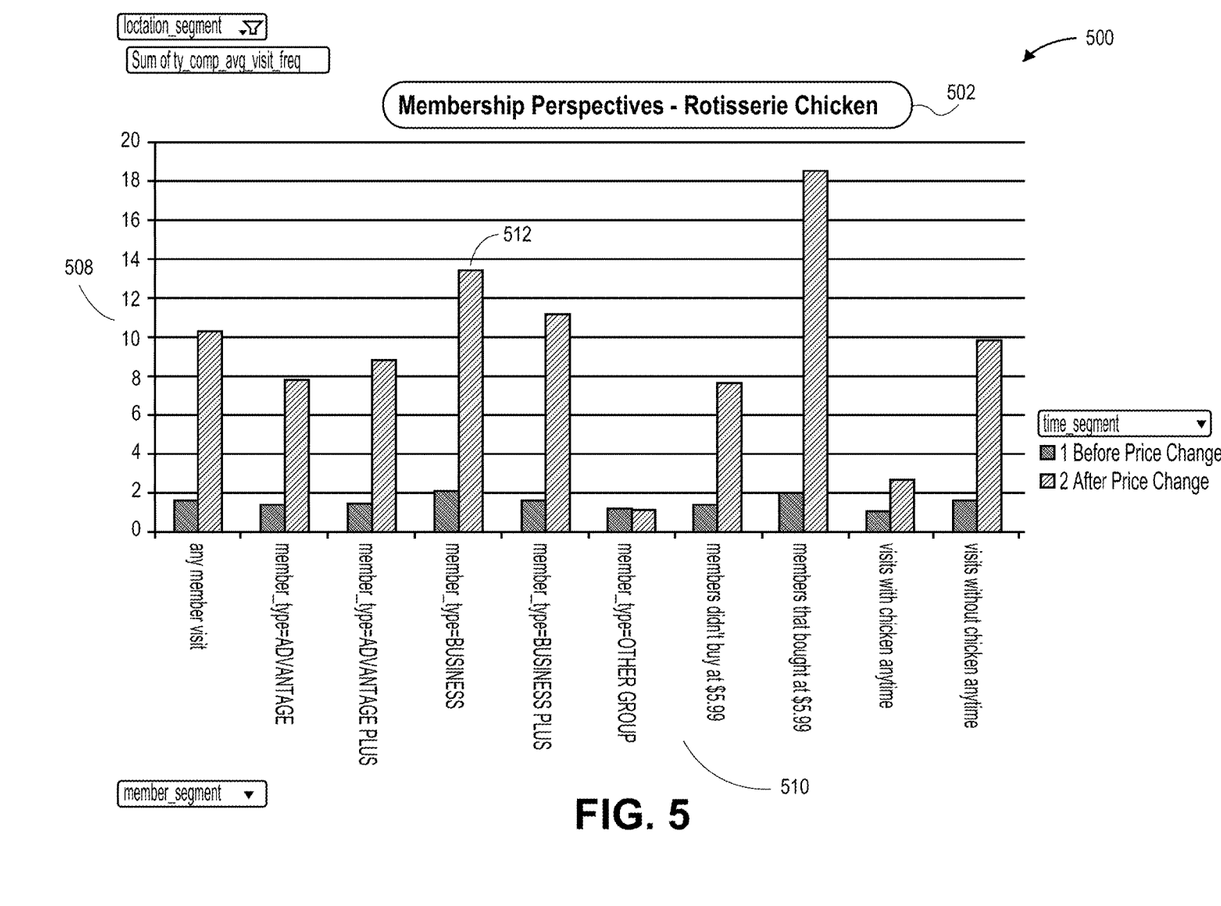

In an operation 214, the processor 107 controls the display 110 to display a result of the comparison of the at least two perspectives as a visualization. For example, FIGS. 4 and 5 illustrate exemplary results from the data perspective analysis carried out using the data perspective analysis system 100 of FIG. 1 presented as visualizations, in accordance with an aspect of the present disclosure. In FIG. 4, a visualization 400 and a visualization 400' (shown as FIG. 4, continued) are illustrated, as an example, for sales of rotisserie chicken by a retailer before and after price change to be displayed on the display 110.

Such visualizations 400 and 400' may be carried out on a region by region basis, and the regions may include, countries, states, counties, cities, individual stores, etc. In the visualization 400, perspective criteria 402 and 404 are presented as radio buttons on a GUI for the agent 102 and/or the one or more viewers 112, although other types of interfaces may be used. A time segment icon 406 allows the agent 102 and/or the one or more viewers 112 to select how membership across different states with respect to numerical values 408 of sales shown by percentages in a map of the United States was before a price change.

In contrast, the visualization 400' illustrates perspective criteria 402' and 404' that are different from the perspective criteria 402 and 404 in the visualization 400. The selection of the perspective criteria 402' and 404' for and after price change event indicated by a time segment icon 406' illustrates numerical values 408' that are different from the numerical value 408 on the visualization 400. The difference in the numerical values 408 and 408' for respective visualizations 400 and 400' illustrate to the agent 102 and/or the one or more viewers 112 how a price change in the exemplary rotisserie chicken affected the sales of the rotisserie chicken in different regions of the visualization 400 (in this example, in different states of USA). Further, selection of different perspective criteria 402, 402', 404, and 404' results in changes to the numerical values 408 to the numerical values 408'.

Likewise, in another aspect, FIG. 5 illustrates the graph or the visualization 500 presenting results of membership perspectives 502 with respect to sales of an item (e.g., rotisserie chicken) on the display 110. The visualization 500 illustrates perspective criteria 504 and 506 corresponding to membership levels before and after price change, respectively, of rotisserie chicken. For example, a number of memberships 508 are presented with respect to perspectives 510 as bars 512.

Both FIGS. 4 and 5 provide different view of the same "perspective" information. FIG. 4 is the "geospatial" view that will display only one timeframe at a time. FIG. 5 shows the same metric for all "perspectives" at the same time, for both time periods. In one aspect, the visualizations 400, 400' and 500 may include one or more visually contrasting display characteristics of the display 110 indicative of the result of the comparison carried out as part of the perspective analysis in the operation 212.

Generally, "perspectives" may be related to a process in which, in order to identify any sort of abnormal behavior (or anomaly), the agent 102 and/or the viewers 112 need to understand what normal behavior looks like. Each time a "perspective analysis" is done, the data perspective server device 106 first determines the perspectives by which comparisons will be made (a minimum of two for each dimension). FIG. 4 provides the ability to show any number metrics by these dimension perspectives, for example:

Who?: Members that bought chicken before, vs. Members that did not.

What?: with Chicken, vs. with no Chicken.

When?: Before the price change, vs. After the price change.

Where?: Clubs that are within 5 miles of any of an organization or entities of which the data perspective analysis system 100 is a part (e.g., a retailer), co-located with a particular organization, or regardless of competition.

These metrics will be displayed on the visualization 400 and the visualization 400' (shown as a map in FIG. 4) aggregated to the following levels: Country, Division, Region, Market, State, and Organization (e.g., store). These metrics can also be displayed on the visualization 500 (FIG. 5) to compare various segments to each other: member segments, time segments, location segments.

For example, the map of the visualization 400 in FIG. 4 shows that Nebraska is unusually low (and Georgia is unusually high) in terms of comparable sales for clubs that compete with a chain store before the price drop on rotisserie chicken. The map of the visualization 400' in FIG. 4 (continued) shows that New Hampshire and North Dakota had unusually strong visit frequency after the price change (compared to other states) for members that bought rotisserie chicken before the price change. FIG. 5 shows that the largest increase of visit frequency was after the price change for members that previously purchased chicken followed by business members.

Various aspects of the disclosure provide a perspective analysis capability environment ("PACE"). The term "capability" relates to enablement of perspective analysis carried out by the data perspective server device 106, that is, the environment of data perspective analysis system 100 will not do the work but rather provide all the tools, technology, and data that is necessary for the agent 102 (e.g., an analyst) to perform the perspective analysis using the data perspective server device 106. The agent 102 may still be needed to use the tools, technology, and data to perform the analysis. PACE is the process of developing perspectives, capturing them in a repository, maintaining these perspectives, retrieving perspectives driving analyses, and presenting the visualization of perspective analysis. Exemplary components of such perspective analysis capability environment are as follows:

User Interface to designate, enter, and maintain perspectives,

Data Integration software for extraction and maintenance of master data and transaction data used in perspective analysis, Perspective analysis capability sandbox and database to store perspective criteria, master data, and transactional data, Capabilities to combine data based upon perspective association criteria, Services to search and view data based upon perspective selection criteria, Services to remove expired and obsolete criteria, master data, and transactional data, Tools to provide perspective analysis, and/or Tools to provide presentations of perspective analysis visualizations.

The PACE concept of "perspective analysis" is the comparison and contrast of two or more different perspectives to understand the differences and similarities. For example, PACE would compare and contrast the basket of the average customer visit (perspective 1) against the basket of the customer who buys rotisserie chicken (perspective 2). This may also include their activity of last year against this year. An exemplary perspective analysis would be as follows:

Gather all baskets from customers that bought an item,

Gather and compare all baskets from customers that didn't buy the item (all the other visits that are not part of prior step), and Gather and compare all the baskets for members that bought the item before price change (prior price change before current price).

In one aspect, the data perspective analysis system 100 is related to analyzing any portion of the business perspective, regardless of whose perspective: whether it is a divisional manager, or a store manager, a buyer, a supplier, a brand, a competitor, a distribution center, human resources or HR, information systems (IS) technology, a CEO, a CFO, a CIO, a CMO, or a CTO, or other "C-level" executive, known to one of ordinary skill in the art.

Various aspects of the disclosure may be used in marketing events, markdowns, rollbacks, clearance events, emergency operations, and grand openings to deal with time related event management to create an environment for the organizations in which they will relate and deal with events as there are commonalities among these things.

Various aspects of the disclosure may be used to better understand customers, associates and partners. Various aspects of the disclosure assist in having customer/people specific responsibilities including various demographics. Such demographics may include, e.g., Ethnic Customer managers, High Income Customer managers, Family vs. Singles, Teen managers, Males, Females, Associates, Politicians, Executives, Managers, the seniors, the baby boomers, the rich, the poor, the healthy, the sick, the physically handicapped, etc. Various aspects of the disclosure enable an organization to manage such dimensions of the business.

Various aspects of the disclosure relate to four or more data dimensions at any level with respect to an organization. For example, an item is only one point in the merchandise dimension. However, the solution according to the various aspects of the disclosure is configured to process all levels of all dimensions without having to build multiple solutions. Various aspects of the disclosure relate to looking at the differences between one perspective, and all others. Some additional examples are as follows:

The business of Rotisserie Chicken, compared to the rest, or the business of a specific Region or other location perspective;

A specific Department or other merchandise perspective;

A specific Demographic or other customer perspective;

A specific time period or other time dimension, and any other dimension.

This concept applies to all parts of the business. However, the analysis of "market basket" is only the beginning, and various aspects of the disclosure are not restricted to analyzing just market basket data and providing a "market basket analysis" solution, then build another solution to deal with "replenishment", which is a process of ensuring a product on the shelf or in inventory for customers and members, and another to deal with "shrink," which is related to the waste of product that occurs from damaged goods, theft, or any other kind of loss of product. Various aspects of the disclosure relate to evolving data to eventually include hundreds or thousands of metrics, for example. However, most people will have only a few metrics in which they are interested. It may be that the metrics must be individualized along with the dimensions and perspectives of concern to each user.

For example, metrics that may be added are inventory, labor, shrink, retail space consumed, turns, returns, misscans, markdowns, throwaway, churn, renewals, coupons, percent cash, and discounts to this design.

Some perspectives may be pre-aggregated daily or even hourly, some weekly, and some as required.

For example, various aspects of the disclosure relate to building hourly views of: All Customers (who), All Items and general merchandise manager(s) (what), Hourly and daily (when), by country and division (where), by competitive market (perspective), and/or other additional dimensions. For example, daily, the aspects of the disclosure may pre-aggregate department merchandise manager (what) and region/state (where). Weekly, the agent 102 and/or the viewers 112 may want to go to a higher level hierarchical grouping of items or products (what), and club (where). As required to a specific item (such as rotisserie chicken), the aspects of the disclosure may determine the requirements and build a service level agreement (SLA) to set the expectations for these capabilities.

Besides having metrics for each dimension, various aspects of the disclosure relate to the ability to see which attribute from each of the four dimensions provide the strongest impact or "lift". That is, various aspects of the disclosure may be used to identify the high affinity dimensions. So, for any given item, "fineline", subcategory or department, the data perspective analysis system 100 may determine which locations are the strongest (in the south, near the ocean, etc.)? Which customers buy it (lower income, seniors, etc.)? During what time frames (Tuesdays, in August, on paydays, during university game days, etc.)? With what other items, categories, departments (with tortillas, canned corn, soft drinks, and paper plates, etc.)? Then, various aspects of the disclosure may be used to differentiate these results depending on various variables (e.g., in a geographic area, for a particular customer segment, at a particular time frame, where an organization competes with other organizations, etc.).

The design requirements are to answer any question by building an information architecture and environment to collect, organize and maintain with respect to:

For Any Metric,

Any Perspective, with business intelligence aggregations to, and causal correlations and interactions with:

Any People (Customer) Dimension,

Any Product Dimension,

Any Time Dimension, and

Any Location Dimension.

On a technology and application architecture, the data perspective analysis system 100 is configured to provide a sub-second response time to display the visualizations 400, 400' and 500 on the display 110.

Accordingly, various aspects of the disclosure relate to the one or more of following:

Establishing perspectives criteria—the user must first set up the rules for the criteria in the data perspective client computer 104. Users will need to maintain the criteria through the data perspective client computer 104 as requirements change.

Capturing criteria in a repository—the data perspective server device 106 will need to store the criteria in the perspective criteria database 108. The data perspective server device 106 will use the perspective criteria to determine what master data and transactional data will need to be gathered.

Maintaining these perspective criteria—users should be able to update, delete, and add additional criteria to established criteria through the data perspective client computer 104. The data perspective server device 106 will remove obsolete criteria as it expires.

Gathering master and transactional data—the data perspective server device 106 will need to extract and load master and transactional data into the memory 117 or other external database (not shown). The data perspective server device 106 gathers data based upon the perspective criteria stored, for example, in the perspective criteria database 108 or the memory 117.

Generating perspectives by applying perspective criteria to master and transactional data—the data perspective server device 106 will merge the associated master and transactional data for each perspective. The data perspective server device 106 will perform comparisons and contrasting of perspectives.

Conducting perspectives analyses—the data perspective server device 106 will conduct different analyses on each perspective, first, to provide independent understanding—the data perspective server device 106 will perform analyses on comparisons and contrasts of perspectives.

Presenting the visualization of perspective analysis—a visualization client controlled using the processor 107, for example, will present each perspective independently on the display 110. The visualization client will present combined perspectives to provide an understanding of differences.

Various aspects of the disclosure provide an environment for constructing, maintaining, retrieving, and utilizing perspectives capabilities to drive analyses and visualizations. Various aspects of the disclosure may communicate with a data warehouse, analytical sandbox, and operational/transactional databases and are not limited to one set of model or structure. Various aspects of the disclosure open the visibility of perspectives for the organization. Various aspects of the disclosure are not associated with specific software, tools, or database systems. Various aspects of the disclosure provide an overall outlook and understanding of any dimension of who, what, when, where, how, or why for the organization at any defined hierarchical level.

Various aspects and functions described herein in accordance with the present aspects of the disclosure may be implemented as hardware, as software, or one or more proper combinations of both, on one or more computer systems or electronic devices. There are many examples of computer systems currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers and switches. Further, one or more aspects of the disclosure may be located on a single computer system or may be distributed among a plurality of computer systems connected to one or more communications networks (not shown).

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the aspects of the disclosure are not limited to being executed on any particular system or group of systems. Further, aspects may be implemented in software, hardware or firmware, or any proper combination(s) thereof. Thus, the aspects may be implemented within methods, acts, systems, system elements and components using a variety of hardware and software configurations, and the embodiments are not limited to any particular distributed architecture, network, or communication protocol.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure. Various aspects of the disclosure with respect to the data perspective analysis system 100 set forth herein improve the functioning of the display 110 in providing dynamic and/or animated visualizations 400, 400', and 500 on a sub-second time frame across various data perspective dimensions to yield deep business intelligence, which otherwise would have remained undiscovered by conventional or manual techniques. Accordingly, the various aspects of the disclosure improve the functioning of the data perspective analysis system 100 overall in its specific implementation to perform the process set forth by the disclosure and as defined by the claims.

What is claimed is:

1. A method for utilizing data from different database types to perform a data perspective analysis, comprising:

retrieving, using a processor, one or more first perspective criteria stored in a first type of database having a first data structure in a first memory device, the one or more first perspective criteria being associated with first relationship criteria for first data dimensions;

retrieving, using the processor, one or more second perspective criteria stored in a second type of database having a second data structure in a second memory device, the one or more second perspective criteria being associated with second relationship criteria for second data dimensions, wherein the second type of database having the second data structure is of a different type and data structure with respect to the first type of database having the first data structure;

retrieving, at the processor, master data and transactional data associated with each of the one or more first perspective criteria and each of the one or more second perspective criteria;

generating, at the processor, one or more perspectives by applying the one or more first perspective criteria and the one or more second perspective criteria to the master data and the transactional data;

comparing, at the processor, at least two perspectives;

allocating, at the processor, groups of pixels to form a dynamic and animated visualization, the allocation based on a result of comparing the at least two perspectives; and rendering, on a display controlled by the processor, the dynamic and animated visualization of the result of comparing the at least two perspectives.

2. The data perspective analysis method of claim 1, wherein the obtaining comprises:

using the stored one or more first perspective criteria and the one or more second perspective criteria to determine the master data and transactional data for said gathering.

3. The data perspective analysis method of claim 1 further comprising:

maintaining, using the processor, the one or more first perspective criteria and the one or more second perspective criteria by updating, deleting or adding additional perspective criteria to the established one or more first perspective criteria and the established one or more second perspective criteria.

4. The data perspective analysis method of claim 3, wherein said deleting is carried out by removing obsolete perspective criteria.

5. The data perspective analysis method of claim 1, wherein said generating the one or more perspectives is carried out by merging the master data and the transactional data.

6. The data perspective analysis method of claim 1, wherein said visualization includes one or more visually contrasting display characteristics indicative of the result.

7. The data perspective analysis method of claim 1 further comprising:

receiving, at the processor, a request from a user to perform said comparing; and validating, at the processor, said request.

8. The data perspective analysis method of claim 7 further comprising:

performing said comparing upon said validating.

9. A data perspective analysis system, comprising:

a first memory device holding a first type of database having a first data structure in which one or more first perspective criteria are stored, the one or more first perspective criteria being associated with first relationship criteria for first data dimensions;

a second memory device holding a second type of database having a first data structure in which one or more second perspective criteria are stored, the one or more second perspective criteria being associated with second relationship criteria for second data dimensions, wherein the second type of database having the second data structure is of a different type and data structure with respect to the first type of database having the first data structure; and a processor in communication with the first memory device and the second memory device and configured to:

retrieve master data and transactional data associated with each of the one or more first perspective criteria and each of the one or more second perspective criteria;

generate one or more perspectives by applying the one or more first perspective criteria and the one or more second perspective criteria to the master data and the transactional data;

compare at least two perspectives;

allocating groups of pixels to form a dynamic and animated visualization, the allocation based on a result of comparing the at least two perspectives; and control a display to render the dynamic and animated visualization of the result of the comparison of the at least two perspectives.

10. The data perspective analysis system of claim 9, wherein the processor is configured to:

use the established one or more first perspective criteria and the established one or more second perspective criteria to determine the master data and transactional data to be gathered.

11. The data perspective analysis system of claim 9, wherein the processor is configured to:

maintain the one or more first perspective criteria and the one or more second perspective criteria by updating, deleting or adding additional perspective criteria to the established one or more first perspective criteria and the established one or more second perspective criteria.

12. The data perspective analysis system of claim 11, wherein the processor is configured to maintain the one or more first perspective criteria and the one or more second perspective criteria to remove obsolete perspective criteria.

13. The data perspective analysis system of claim 9, wherein the processor is configured to:

merge the master data and the transactional data to generate said one or more perspectives.

14. The data perspective analysis system of claim 9, wherein said visualization includes one or more visually contrasting display characteristics indicative of the result.

15. The data perspective analysis system of claim 9, wherein the processor is configured to:

receive a request from a user to perform said comparison;

validate said request; and perform said comparison upon said validating.

16. A computer readable medium storing computer executable instructions thereupon for utilizing data from different database types to perform a data perspective analysis, the instructions when executed by a processor cause the processor to:

retrieve one or more first perspective criteria stored in a first type of database having a first data structure in a first memory device, the one or more first perspective criteria being associated with first relationship criteria for first data dimensions;

retrieve one or more second perspective criteria stored in a second type of database having a first data structure in a second memory device, the one or more second perspective criteria being associated with second relationship criteria for second data dimensions, wherein the second type of database having the second data structure is of a different type and data structure with respect to the first type of database having the first data structure;

retrieve master data and transactional data associated with each of the one or more first perspective criteria and each of the one or more second perspective criteria;

generate one or more perspectives by applying the one or more first perspective criteria and the one or more second perspective criteria to the master data and the transactional data;

compare at least two perspectives;

allocating groups of pixels to form a dynamic and animated visualization, the allocation based on a result of comparing the at least two perspectives; and control a display to render the dynamic and animated visualization of the result of the comparison of the at least two perspectives.

17. The computer readable medium of claim 16, wherein the instructions when executed by a processor cause the processor to:
use the established one or more first perspective criteria and the established one or more second perspective criteria to determine the master data and transactional data to be gathered.

18. The computer readable medium of claim 16, wherein the instructions when executed by a processor cause the processor to:
maintain the one or more first perspective criteria and the one or more second perspective criteria by updating, deleting or adding additional perspective criteria to the established one or more first perspective criteria and the established one or more second perspective criteria.

19. The computer readable medium of claim 18, wherein the instructions, when executed by the processor, further cause the processor to:
maintain the one or more first perspective criteria and the one or more second perspective criteria to remove obsolete perspective criteria.

20. The computer readable medium of claim 16, wherein the instructions when executed by a processor cause the processor to:
receive a request from a user to perform said comparison;
validate said request; and
perform said comparison upon said validating.

* * * * *